United States Patent [19]

Nishiwaki

[11] Patent Number: 5,333,975
[45] Date of Patent: Aug. 2, 1994

[54] METHOD OF AND APPARATUS FOR DRESSING TIPS FOR WELDING MACHINES

[75] Inventor: Toshihiro Nishiwaki, Tokyo, Japan
[73] Assignee: Obara Corporation, Tokyo, Japan
[21] Appl. No.: 961,490
[22] Filed: Oct. 15, 1992
[51] Int. Cl.⁵ .................................................. B23C 3/00
[52] U.S. Cl. .................................. 409/132; 409/140; 409/175
[58] Field of Search ............... 409/132, 140, 149, 175, 409/181, 218; 408/6, 7, 9, 12

[56] References Cited

U.S. PATENT DOCUMENTS 4,118,139 10/1978 Lemelson ............................. 408/12
4,668,136 5/1987 Santa ................................... 409/181

FOREIGN PATENT DOCUMENTS 4-127975 4/1992 Japan.

Primary Examiner—Z. R. Bilinsky
Attorney, Agent, or Firm—Flynn, Thiel, Boutell & Tanis

[57] ABSTRACT

A method of and apparatus for dressing tips for welding machines equipped with tips which are advanced toward a dresser body so as to be dressed by the cutters of the dresser body at a pressurized state. The method comprises the steps of driving to rotate the cutters before the tips are brought into contact with the cutters, pressing the tips to the cutters so that the dressing of the tips starts by being cut by the cutters while the tips are brought into contact with the cutters at a given time, moving the tips away from the cutters while the cutters keep to rotate, and completing the dressing of the tips by gradually reducing the application of the pressure to the tips. The apparatus comprises elements to embody the method.

8 Claims, 3 Drawing Sheets

METHOD OF AND APPARATUS FOR DRESSING TIPS FOR WELDING MACHINES

BACKGROUND OF THE INVENTION

1. Field of the Invention

The present invention relates to a method of and an apparatus for dressing tips for welding machines (hereinafter referred to as tips) wherein the tips are advanced toward a dresser body and are cut by the dresser body.

2. Prior Art

Japanese Patent Laid-Open Publication No. 4-127975 discloses a conventional method of and apparatus for dressing tips wherein when the tips are cut by a dresser body, the tips are advanced toward the dresser body to thereby press cutters of the dresser body whereby the cutters start to rotate. At this state, the tips are cut by the cutters while they press the dresser body for a given time, namely, under pressurized state. The tips are moved away from the dresser body immediately after the given time lapses and the cutters stop their rotation so that the dressing of the tips are completed.

This is described more in detail with reference to FIG. 6. In the same figure, a base 31 has rising portions 32 and 32 at both ends thereof. A pressure chamber 33 has shafts 34 and 35 which extend leftward and rightward therefrom. Each end of the shafts 34 and 35 is brought into contact with the rising portions 32 and 32. Each another end of the shafts 34 and 35 are housed in the pressure chamber 33 and always receives pressurized air in the pressure chamber 33 or pressing force of urged springs. A dresser body 36 has cutters 37 and 38 disposed at the tip end thereof, a box 39 disposed at the front portion thereof and having therein a drive mechanism (not shown) for driving the cutters 37 and 38, a known air motor (not shown) disposed therein for rotatably driving the cutters 37 and 38, and a connecting port (not shown) disposed at the rear end thereof and connected to a pressurized air supply pipe for actuating the air motor. The dresser body 36 has a through hole 40 bored therein. A holding shaft 41 penetrates the through hole 40 and has both ends which are respectively fixed to supporting members 42 and 42 respectively formed at both side surfaces of the pressure chamber 33. The holding shaft 41 has coil springs 43 and 43 which are wound thereon. The coil springs 43 and 43 are urged to press the dresser body 36. The pressure chamber 33 has switch holders 44 and 45 which respectively protrude from both side surfaces thereof. Switches 46 and 47 are respectively provided at the upper ends of the switch holders 44 and 45 and face side surfaces of the dresser body 36. The driving operation of the air motor is controlled by the switches 46 and 47.

Designated at 48 is a guide of the pressure chamber 33, and at 49 and 50 as illustrated by imaginary lines are tips to be dressed.

In case of dressing the tip 49, it is moved rightward in FIG. 6 so as to press the cutter 37 of the dresser body 36 at the tip end thereof. When the force of the tip 49 to press the cutter 37 (hereinafter referred to as pressing force) exceeds the urging force of the right coil spring 43, i.e. the force to urge the dresser body 36, the dresser body 36 is moved rightward and is brought into contact with the switch 46 at one side surface thereof so that the switch 46 is turned on. As a result, the pressurized air is supplied to the air motor by way of a control circuit, not shown, to thereby drive the air motor so that the cutter 37 rotates to dress the tip 49. Upon completion of the dressing of the tip 49, the tip 49 is moved leftward so that the pressing force of the tip 49 is released. Consequently, the dresser body 36 is moved leftward by the urging force of the right coil spring 43 so that the switch 46 is turned off. As a result, the pressurized air is not supplied to the air motor so that the cutter 37 stops its rotation.

However, when the shapes of the tips are greatly deformed at the time when the tips are dressed (refer to FIG. 4), for instance, when a mushroom-shaped projection 26 is formed at the tip end of the tip as illustrated in FIG. 4, the resistance of the tip against the cutter becomes large at the first stage of the dressing of the tip, whereby the cutter does not rotate even if the pressing force of the tip turns on the switch 46. Accordingly, the dresser body has not been effectively utilized.

The cutters normally comprise one blade or two blades configuration of which are conformity with recessed curved surfaces of the tips. There is such a problem that a stepped portion 27 remains on the curved surface of the tips upon completion of the dressing of the tip as illustrated in FIG. 5, which impedes the normal welding operation.

The present invention has been made in view of the problems set forth above and is to provide a method of and apparatus for dressing the tips wherein the cutters rotate before the tips are brought into contact with the cutters, then the tips are subjected to the first dressing, i.e. cut by the cutters and thereafter the tips are subjected to the last dressing so that the operation of the dresser body is assured and the stepped portions are eliminated from the curved surface of the tips.

To achieve the above object, the present invention comprises the steps of driving to rotate the cutters before the tips are brought into contact with the cutters, pressing the tips to the cutters, starting to dress, i.e. cutting the tips while the tips press the cutters, i.e. under pressurized state at a given time, moving the tips away from the cutters while the cutters continue to rotate and dressing the tips by gradually releasing the application of the pressure to the tips.

Accordingly, since the cutters normally rotate before the tips are brought into contact with the cutters of the dresser body, even if the deformed tips press the rotating cutters, the cutters do not stop their rotation whereby the normal dressing can be effected. Although the stepped portions are present on the surfaces of the tips which were cut by the cutters under pressurized state at a given time, the stepped portions are gradually cut by releasing the application of the pressure to the tips while the cutters continue to rotate.

PREFERRED EMBODIMENT OF THE INVENTION

Figure 2:
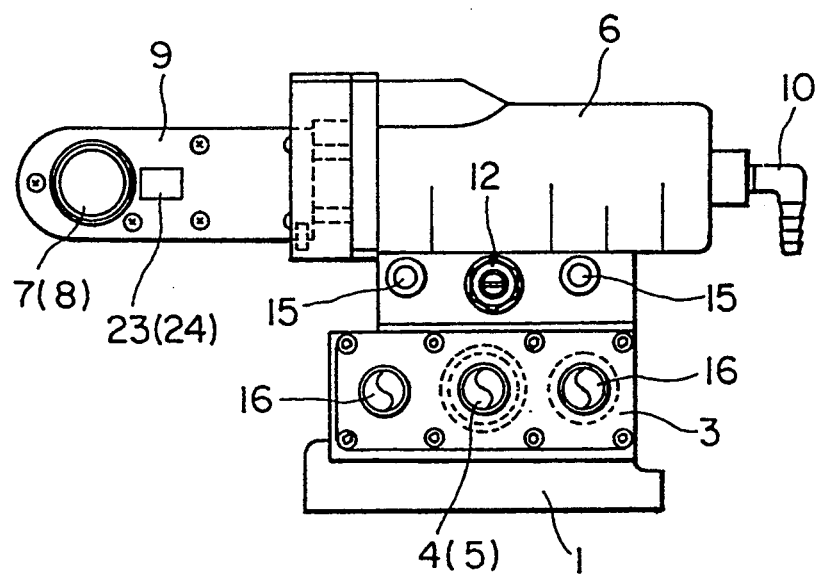
FIG. 2 is a side view of the dresser body in FIG. 1.
Figure 3:
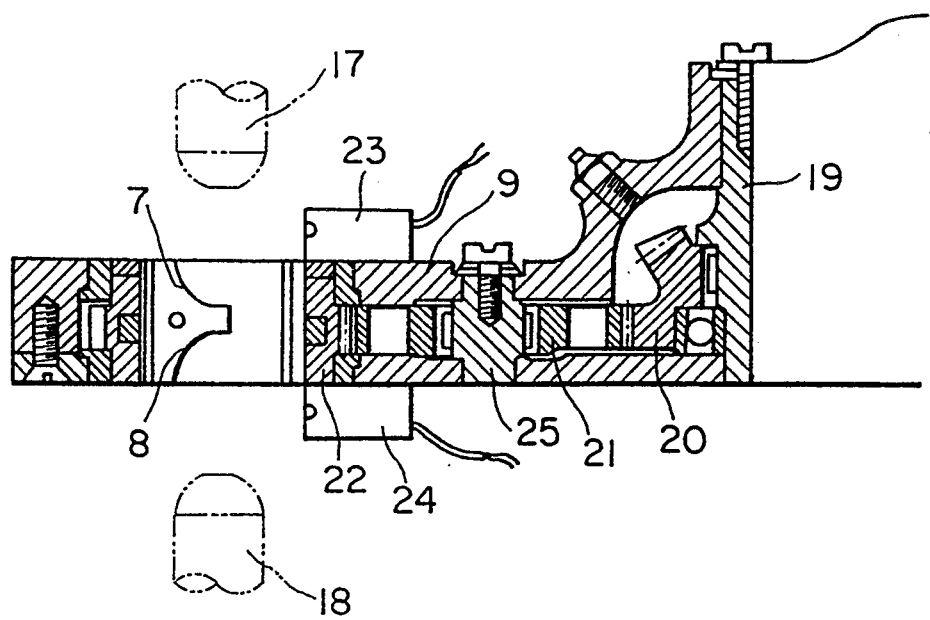
FIG. 3 is a cross-sectional view showing a main portion of a drive mechanism of the dresser body in FIG. 1.

A method of and an apparatus for dressing tips for welding machines according to a preferred embodiment of the present invention will be described with reference to FIGS. 1 to 3.

Figure 1:
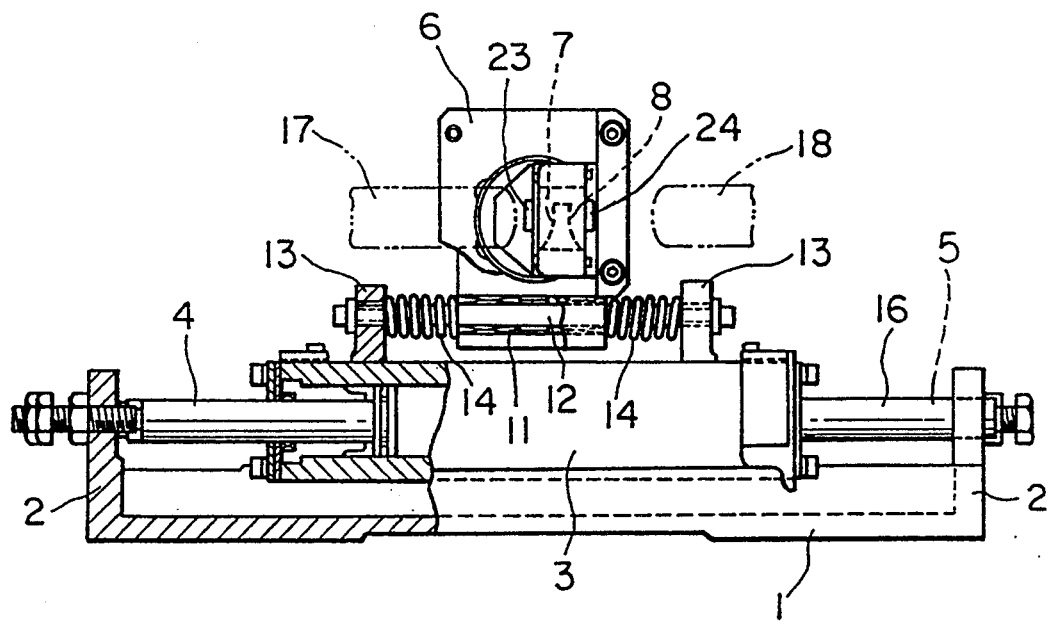
FIG. 1 is a front view of a dresser body which is adapted for embodying the dressing method according to the present invention.

In FIG. 1, a base 1 has rising portions 2 and 2 at both ends thereof. A pressure chamber 3 has shafts 4 and 5 which extend leftward and rightward therefrom. Each end of the shafts 4 and 5 is brought into contact with the rising portions 2 and 2. Each another end of the shafts 4 and 5 are housed in the pressure chamber 3 and always receives pressurized air in the pressure chamber 3 or pressing force of urged springs.

A dresser body 6 has cutters 7 and 8 disposed at the tip end thereof, a box 9 disposed at the front portion thereof and having therein a drive mechanism (refer to FIG. 3) for driving the cutters 7 and 8, a known air motor (not shown) disposed therein for rotatably driving the cutters 7 and 8, and a connecting port 10 disposed at the rear end thereof and connected to a pressurized air supply pipe for actuating the air motor. The dresser body 6 has a through hole 11 bored therein. A holding shaft 12 penetrates the through hole 11 and has both ends which are respectively fixed to supporting members 13 and 13 respectively formed at both side surfaces of the pressure chamber 3. The holding shaft 12 has coil springs 14 and 14 which are wound thereon. The coil springs 14 and 14 are urged so as to press against the dresser body 6.

Designated at 15 is a guide of the dresser body 6, at 16 is a guide of the pressure chamber 3, and at 17 and 18 as illustrated by imaginary lines are tips to be dressed.

The box 9 has a rotary shaft 19 of the air motor which is supported thereby for rotating the cutters 7 and 8 by way of gears 20, 21 and 22. The box 9 also has tip sensors 23 and 24 disposed at both surfaces thereof. Designated at 25 is a shaft of the gear 21.

Figure 4:
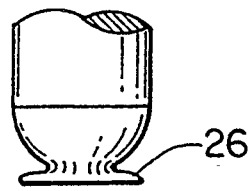
FIG. 4 is a side view of a tip before it is dressed.
Figure 5:
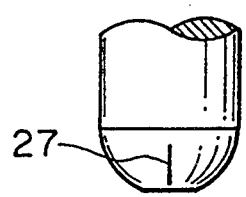
FIG. 5 is a side view of a tip which is formed by a conventional method.
Figure 6:
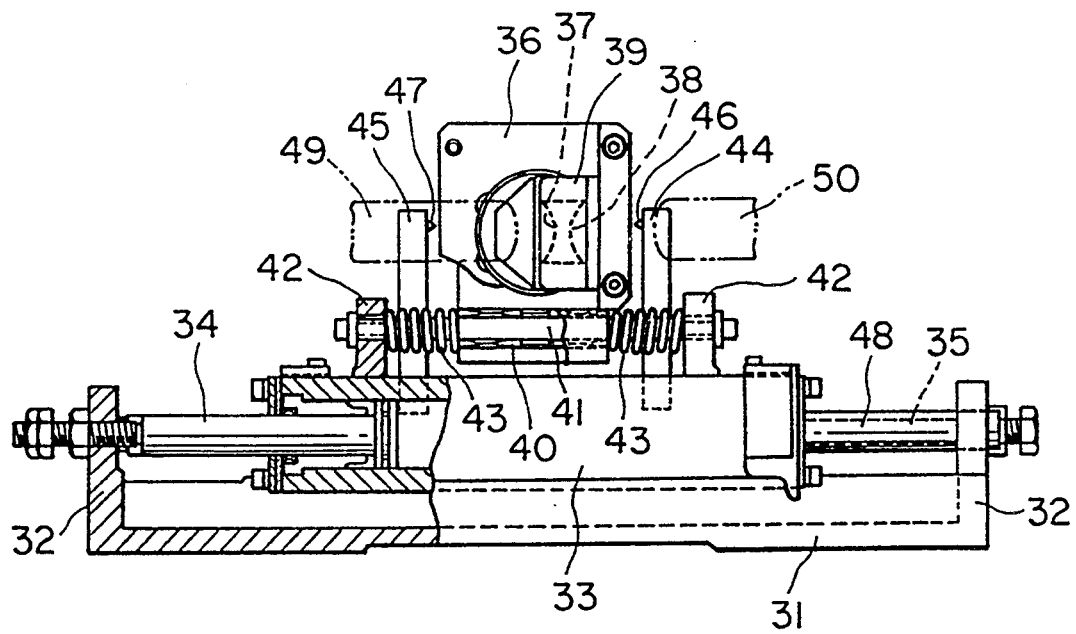
FIG. 6 is a side view of a conventional dresser body.

When a resistance welding machine is moved close to the dresser body by a welding robot or manually in case of dressing the tips 17 and 18, the tip 17 is first advanced to the cutter 7 by a pressure cylinder (not shown) of the resistance welding machine. When the tip 17 is advanced to the cutter 7, the tip sensor 23 is actuated whereby the pressurized air is supplied from the connecting port 10 to the air motor by a control circuit (not shown). As a result, the air motor is driven so that the driving force of the air motor is transmitted from the rotary shaft 19 to the gears 20, 21 and 22, thereby rotating the cutters 7 and 8. When the tip 17 is further advanced to the cutter 7 and is finally brought into contact with the cutter 7. At this time, since the cutter 7 normally rotates, even if the deformed tip 17 as illustrated in FIG. 4 is brought into contact with the cutter 7, the cutter 7 does not stop its rotation. Successfully, if the tip 17 is further advanced to the cutter 7, both the tip 17 and the cutter 7 are in the pressurized state.

When the pressing force of the tip 17 exceeds the urging force of the right spring 14 in FIG. 1, the dresser body moves rightward in FIG. 1 whereby the tip 17 is cut by the cutter 7 with assurance while the pressurized state between the tip 17 and the cutter 7 is maintained constant. The pressing force of the tip 17 is transmitted to the base 1 by way of the spring 14, the supporting member 13, the pressure chamber 3 and the shafts 4 and 5. Repelling force of the force to press the cutter is applied to the pressure chamber 3 but it is absorbed by the pressurized air in the pressure chamber 3 or the spring 14.

After the given time lapses, the tip 17 is dressed substantially in the desired shape. Accordingly, if the tip 17 is moved away by the pressure cylinder from the cutter while the cutter 7 continues to rotate, the application of the pressure to the tip is reduced to thereby reduce the pressing force of the tip 17 against the cutter 7 whereby the tip 17 is dressed. As the dressing progresses, the stepped portion 27 is gradually eliminated.

When the tip 17 is moved away from the cutter 7, the tip sensor 23 is actuated so that the supply of the pressurized air supplied by the control circuit to the air motor through the connecting port 10 is stopped. As a result, the rotation of the air motor is stopped to thereby stop the rotation of the cutters 7 and 8 by the rotary shaft 19 through the gears 20, 21 and 22.

Thereafter, the tip 18 is moved toward the cutter 8 whereby the tip sensor 24 is actuated. In the same manner as the actuation of the tip sensor 23, firstly the cutters 7 and 8 rotate, secondly the tip 18 is brought into contact with the cutter 8, thirdly the dresser body 6 moves leftward in FIG. 1, fourthly the tip 18 is cut by the cutter 8 with assurance, fifth the tip 18 is dressed by the cutter 8 and lastly the cutters 7 and 8 stop the rotation.

The spring 14 is used as an urging apparatus for generating pressing force between the tips and the cutters but can be replaced by a fluid cylinder to thereby vary the pressing force. In case of dressing the tips vertically, considering the weight of the resistance welding machine, resilience force of the upper and lower springs 14 are varied or diameters of the upper and lower fluid cylinders are varied or fluid pressure to be supplied to the upper and lower fluid cylinders are varied to perform such dressing of the tips.

Since the cutters normally operate before the tips are brought into contact with the cutters, even if the deformed tips press the cutters, the cutters do not stop their rotation so that the normal dressing can be effected, which assures the tip dressing.

Since the application of the pressure to the tip is gradually reduced while the rotation of the cutters keeps constant after the tips are cut by the cutters under pressurized state at a give time, the desired tips having no stepped portion can be formed, thereby performing the accurate welding operation without being impeded by the stopped portion which has been formed in the conventional tips.

What is claimed is:

1. A method of dressing a welding tip for a welding machine utilizing a dressing apparatus, comprising the steps of:

advancing the welding tip toward a dressing means associated with the dressing apparatus, said dressing means including at least one rotatable cutting blade which dresses the welding tip;

sensing the presence of the welding tip when the welding tip is in close proximity to but spaced away from said cutting blade;

activating said cutting blade after sensing the presence of the welding tip, further advancing the welding tip to contact said cutting blade after said cutting blade is activated to prevent said cutting blade from biting into the welding tip and stopping its rotation;

applying pressure to the welding tip to maintain contact between the welding tip and said cutting blade for a predetermined time period so that said cutting blade dresses the welding tip; and gradually withdrawing the welding tip from said cutting blade after the elapse of said predetermined time period while said cutting blade continues to rotate to further dress the welding tip.

2. An apparatus for dressing a welding tip for use with a welding machine, the apparatus comprising:

means for dressing the welding tip including at least one rotatable cutting blade which dresses the welding tip;

means for sensing the presence of the welding tip when the welding tip is advanced into close proximity with but spaced away from said cutting blade;

means for activating said cutting blade in response to said sensing means before the welding tip is further advanced into contact with said cutting blade to prevent said cutting blade from biting into the welding tip and stopping its rotation, the welding tip being maintained in contact with said cutting blade for a predetermined time period so that said cutting blade dresses the welding tip; and means for further dressing the welding tip as the welding tip is gradually withdrawn away from said cutting blade after the elapse of said predetermined time period while said cutting blade remains activated.

3. An apparatus for dressing a plurality of welding tips for use with a welding machine, the apparatus comprising:

a base member having first and second spaced-apart upstanding members extending therefrom;

a pressurized chamber disposed between said upstanding members and having first and second shafts extending from respective ends of said pressurized chamber to said first and second upstanding members respectively, said pressurized chamber also having third and fourth spaced apart upstanding members extending from a surface thereof;

a dresser body having a bore therethrough which slidably engages a holding shaft extending between said third and fourth upstanding members;

first and second rotatable cutting blades coupled to said dresser body which respectively dress first and second welding tips which are alternatively advanced into contact with said respective cutting blades;

means for opposing said dresser body when said dresser body is urged in either direction along said holding shaft when pressure applied to said first or said second cutting blade by the welding machine and said respective welding tip exceeds a predetermined value;

means for sensing the presence of said first and second welding tips when said welding tips are advanced into close proximity with but spaced away from said respective cutting blades;

means for activating said first or second cutting blade after sensing the presence of said respective welding tip and before said respective welding tip is advanced into contact with said respective cutting blade; and means for further dressing said respective welding tip as said respective welding tip is gradually withdrawn away from said respective cutting blade after the elapse of a predetermined time period while said respective cutting blade remains activated.

4. The apparatus according to claim 3, wherein said means for activating includes a plurality of gears rotatably supported in a gear box extending from said dresser body, and an air motor for driving said plurality of gears.

5. The apparatus according to claim 3, wherein said means for opposing includes first and second urging devices disposed between respective ends of said dresser body and said third and fourth upstanding members respectively.

6. The apparatus according to claim 5, wherein said first urging device provides an urging force different from that of the second urging device.

7. The apparatus according to claim 5, wherein the urging devices are coil springs.

8. The apparatus according to claim 7, wherein one coil spring has a resiliency different from that of the other coil spring.

* * * * *

UNITED STATES PATENT AND TRADEMARK OFFICE
CERTIFICATE OF CORRECTION

PATENT NO. : 5,333,975
DATED : August 2, 1994
INVENTOR(S) : Toshihiro NISHIWAKI

It is certified that error appears in the above-indentified patent and that said Letters Patent is hereby corrected as shown below:

On the title page, immediately below the line in the left column which sets forth the filing date, please add the following:

---[30] Foreign Application Priority Data
September 1, 1992 [JP] Japan.......4-267861---.

Signed and Sealed this

Eighteenth Day of October, 1994

Attest:

BRUCE LEHMAN

*Attesting Officer*   *Commissioner of Patents and Trademarks*